United States Patent [19]

Kish

[11] Patent Number: 4,728,486
[45] Date of Patent: Mar. 1, 1988

[54] PRESSURIZED WATER NUCLEAR REACTOR PRESSURE CONTROL SYSTEM AND METHOD OF OPERATING SAME

[75] Inventor: Nicholas W. Kish, Munhall, Pa.

[73] Assignee: Westinghouse Electric Corp., Pittsburgh, Pa.

[21] Appl. No.: 765,465

[22] Filed: Aug. 14, 1985

[51] Int. Cl.$^4$ .............................................. G21C 9/00
[52] U.S. Cl. ........................... 376/307; 137/247.25; 137/247.41; 376/203; 376/247; 376/283
[58] Field of Search .............. 376/216, 247, 283, 307, 376/203; 137/247.25, 247.41

[56] References Cited

U.S. PATENT DOCUMENTS

| | | | |
|---|---|---|---|
| 266,485 | 10/1882 | Lightbody | 137/247.25 |
| 288,573 | 11/1883 | Hyde | 137/247.25 |
| 680,380 | 8/1901 | Hyde | 137/247.25 |
| 766,764 | 8/1904 | Keyt | 137/247.41 |
| 2,942,615 | 6/1960 | Dayton | 376/203 |
| 3,072,550 | 1/1963 | Fortescue et al. | 137/247.41 |
| 3,114,414 | 12/1963 | Judd | 376/307 |
| 4,584,164 | 4/1986 | McMullin et al. | 376/216 |
| 4,588,548 | 5/1986 | Magee et al. | 376/307 |

FOREIGN PATENT DOCUMENTS

| | | | |
|---|---|---|---|
| 979781 | 12/1975 | Canada | 137/247.25 |
| 837310 | 2/1939 | France | 137/247.25 |

OTHER PUBLICATIONS

Olivon et al., Nuclear Engineering International, May 1984, pp. 40–43.

Primary Examiner—Deborah L. Kyle
Assistant Examiner—Richard W. Wendtland
Attorney, Agent, or Firm—D. C. Abeles

[57] ABSTRACT

A pressure control system for a pressurized water nuclear reactor and method for quickly closing the valves associated with the pressurizer thereof has a temperature detection device on the loop seal of each valve and a valve responsive thereto to change water to the loop seal upon a temperature rise therein and stop the flow of water to the loop seal upon a temperature drop therein. The rapid formation of water seals in the loop seals for the valves protects the valve seats from wear and degradation and prolongs the life thereof.

15 Claims, 4 Drawing Figures

PRESSURIZED WATER NUCLEAR REACTOR PRESSURE CONTROL SYSTEM AND METHOD OF OPERATING SAME

FIELD OF THE INVENTION

A pressure control system for a pressurized nuclear water reactor and method for operating the same provides means for reducing the time for a safety valve or power operated relief valve of a pressurizer to close a steam line, following discharge of a water seal from loop seals associated with each of the valves.

BACKGROUND OF THE INVENTION

In a pressurized water nuclear reactor plant, a primary coolant loop and secondary coolant loop are used to produce steam for the production of electricity. In the primary coolant loop, a pressurized fluid is passed through a nuclear reactor and, after being heated, through a line which contains a pressurizer, to a steam generator. The heated fluid enters the primary side of the steam generator which is divided into an inlet section and an outlet section by a divider plate. A tub sheet divides the steam generator into the primary side and a second side, which tube sheet has an array of holes having U-shaped heat transfer tubes inserted therein, which communicate between the inlet section and outlet section of the primary side of the steam generator. In operation, the heat pressurized fluid passes through the U-shaped heat transfer tubes and is discharged from the outlet section of the primary side of the steam generator to a line, containing a primary coolant pump, back to the reactor in a continuous closed loop. Secondary coolant is passed through the secondary side of the steam generator where it is converted into steam by heat released by the primary coolant passing through the U-shaped heat transfer tubes, which steam is used to drive a turbine to produce electricity.

The reactor coolant pressure is controlled by a pressure control system containing a pressurizer, which is a vertical, cylindrical vessel with hemispherical top and bottom heads, wherein water and steam are maintained in equilibrium by electrical heaters and water sprays. Steam can be formed by activating the heaters to increase the pressure in the primary coolant loop, or condensed by the water sprays to reduce the pressure. Power operated relief valves and spring loaded safety valves are connected to the pressurizer and discharge to a pressurizer relief tank, where steam from the pressurizer is condensed and cooled by mixing with water.

The pressure control system for the primary loop thus includes the pressurizer and the associated sprays, heaters, power operated relief valves, safety valves, relief tank, and surge lines. This equipment is designed to accommodate changes in system volume and to limit changes in system pressure due to reactor coolant loop temperature variations during all modes of plant operation.

To reduce the problem of leakage through the valve seats, a water seal is maintained upstream of each valve seat of the pressurizer valves. The pipes connecting the pressurizer nozzles to their respective valves are shaped in the form of a loop seal. If the pressurizer pressure exceeds the set pressure of the valves, they will open, and the water from the loop seal will discharge during the accumulation period.

The power operated relief valves and safety valves, which must close a steam line after the pressure drops below a desired trip threshold, do not fully seal so long as steam continues to pass over the valve seat. Conventionally, the water seal in the loop seal associated with each valve is formed by condensation of steam in the area of the loop seal. During such condensation, steam continues to bleed through the valve creating an upstream pressure (or source) stabilization problem, and this high pressure jet bleeding of steam threatens the valve integrity by rapidly eroding the valve seat. Thus, until a replacement water seal for the valve seat is formed, problems exist.

It is an object of the present invention to provide an improved pressure control system for a pressurized water nuclear reactor system which results in a decrease in the response time of closing of the power operated relief valves and safety valves associated with the pressurizer.

It is another object of the present invention to provide an improved pressure control system for a pressurized water nuclear reactor system that enhances the life and reliability of power operated relief valves and safety valves associated with the pressurizer.

It is a further object of the present invention to provide a method of quickly closing and sealing, by means of a water seal, the power operated relief valves and safety valves associated with the pressurizer of a pressurized water nuclear reactor plant.

SUMMARY OF THE INVENTION

An improved pressure control system for a pressurized water nuclear reactor, and method of operating the same, has a charging conduit for charging water to the loop seals of power operated relief valves and safety valves on the pressurizer. A temperature detector is provided on each loop seal which senses a rise in temperature in the area of the loop seal upon discharge of the water seal therefrom and actuates a valve to supply water to the charging conduits. The water supply is taken from the line which feeds water to the sprayers in the pressurizer. The water supply conduit has a flow restriction orifice therein and flow restriction orifices are also provided to control the rate of flow of water to each loop seal. When a respective valve closes adjacent the loop seal and the loop seal is again filled with water, the temperature therein is lowered and the temperature detector senses the lower temperature and closes the valve in the water supply conduit.

DETAILED DESCRIPTION

The improved pressure control system of the present invention provides for quick replacement of a water seal for the power operated relief valves and safety valves of a pressurizer to protect the valve seats and prolong the life of the same.

Figure 1:
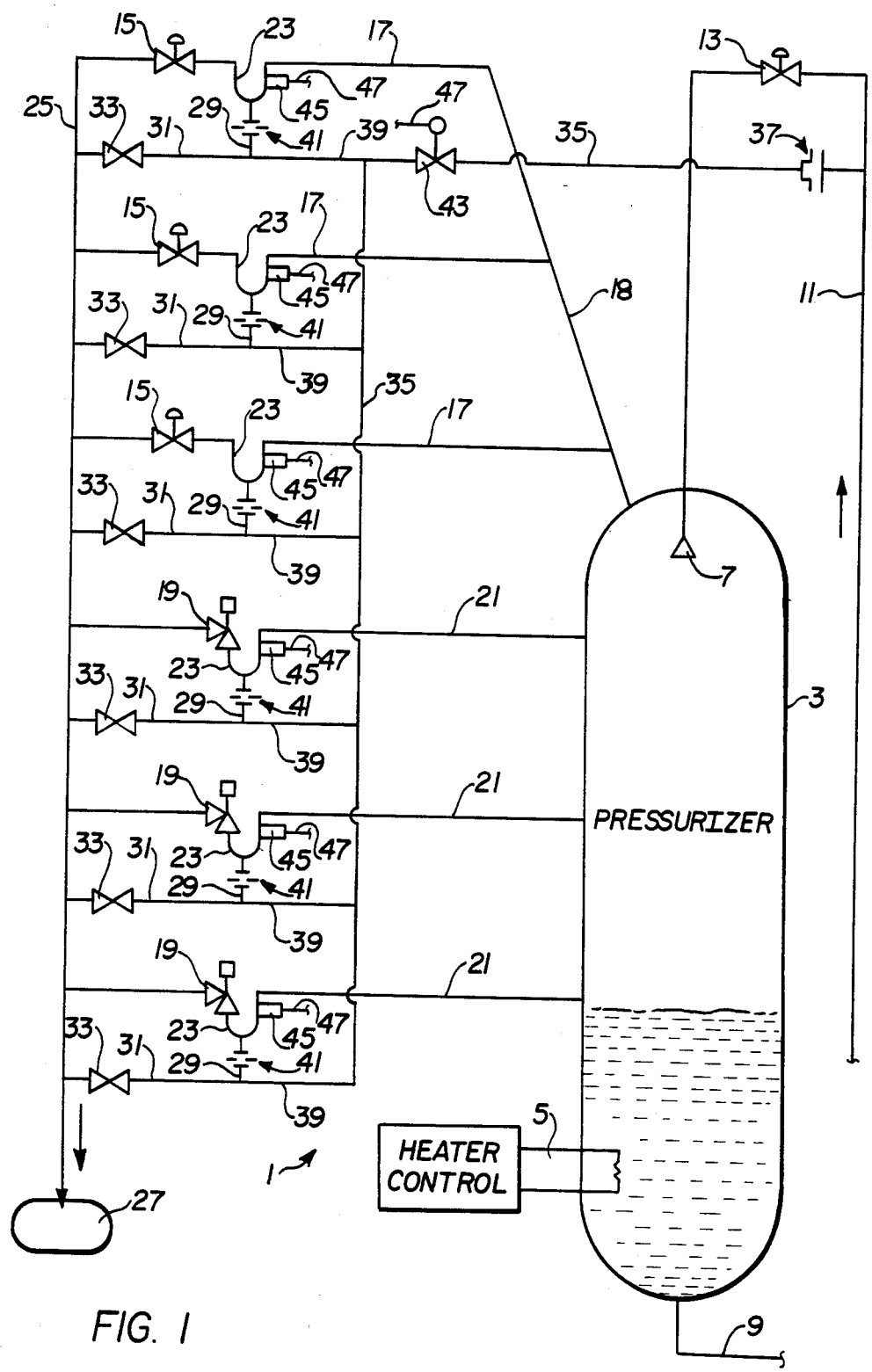
FIG. 1 is a schematic illustration of the pressure control system for a pressurized water nuclear reactor according to the present invention.

In FIG. 1, there is schematically illustrated an improved pressure control system for a pressurized water nuclear reactor which incorporates the loop seal water charging system of the present invention. The pressure control system 1, contains a pressurizer 3, normally formed as a vertical, cylindrical vessel, composed of carbon steel with austenitic stainless steel cladding on all surfaces exposed to primary reactor coolant. Electrical heaters 5 are provided in the bottom portion of the pressurizer 3 and spray nozzles 7 are provided in the upper portion thereof. The pressurizer is designed to accommodate positive and negative surges caused by load transients on the system. A surge line 9, attached to the bottom of the pressurizer 3, connects the pressurizer with the hot leg of a reactor coolant loop. During an insurge, the spray nozzles 7, which are fed from the cold leg of the reactor coolant through line or sprayer conduit 11, containing a regulating value means 13, spray water into the upper portion of the pressurizer 3 to condense steam in the pressurizer 3 to prevent the pressure in the pressurizer from reaching the setpoint of power operated relief valves 15, in lines 17, which are normally fed from an off take line 18 connected to the pressurizer 3. During an outsurge, flashing water to steam and generation of steam by actuation of heaters 5 keep the pressure above the low pressure reactor trip setpoint.

The pressurizer 3 is also provided with safety relief valves 19, normally three such valves, as illustrated. The safety relief valves 19, in lines 21, are spring loaded and self-activated with back pressure compensation. Loop seals 23 are provided adjacently upstream in lines 17 and 21 of each of the power operated relief valves 15 and safety valves 19 for the protection of the valve seats of each of the valves. The loop seals 23 are in the form of a U-bend in the line below the valves, wherein condensed water accumulates as a loss of heat to the ambient occurs. This accumulated water prevents leakage of hydrogen or steam through the valve seat, and serves to keep the valve cool and protect the valve seat from wear. The power operated relief valves 15 and safety values 19 discharge into a common line 25 which leads to a pressurizer relief tank 27.

A conduit 29 is provided which communicates with each of the loop seals 23 and to a drain conduit 31 containing a valve 33 for draining the accumulated water from the loop seals, to common line 25, during maintenance or repair of the valves.

The system as aforedescribed, is conventional, with the provision of loop seals to protect the power operated relief valves and safety valves. Once the accumulated water has been discharged from the loop seals by steam released by the pressurizer, however, closure of the valves completely is delayed so long as steam continues to pass over the valve seat and until further condensed steam has been accumulated to once again form the water seal.

According to the present invention, means are provided to more quickly form the water seal in the loop seal of the valves to improve response time, and enhance valve life and reliability by reducing degradation of the valve seat.

Means are provided for charging water to each of the loop seals, with means responsive to a rise of temperature therein, and with activation of the feeding of water being responsive to such rise in temperature. As illustrated, a common water supply comprises a conduit 35 communicating with the line 11, which feeds water to the sprayers 7 of the pressurizer 3. The conduit 35 has a flow restriction orifice 37 therein to control the rate of flow of water therethrough. The common water supply conduit 35 supplies water to branch conduits or fill lines 39, one of such branch conduits 39 communicating with each of the conduits 29, and adapted to supply water to each of the loop seals 23 through conduits 29. A flow restriction orifice 41 is provided in each of the conduits 29 to control the rate of flow of water therethrough. A valve 43 is provided in the common water supply conduit 35 to control the passage of water therethrough and to the branch conduits 39.

A temperature detecting device 45, such as a non-invasive strap-on type of temperature detector is provided on each of the loop seals 23. The temperature detecting device 45 has a lead 47 which is operatively connected to the valve 43, preferably a solenoid valve, and is effective to open or close the valve 43 in response to a rise or drop in temperature detected in a loop seal 23.

Figure 2:
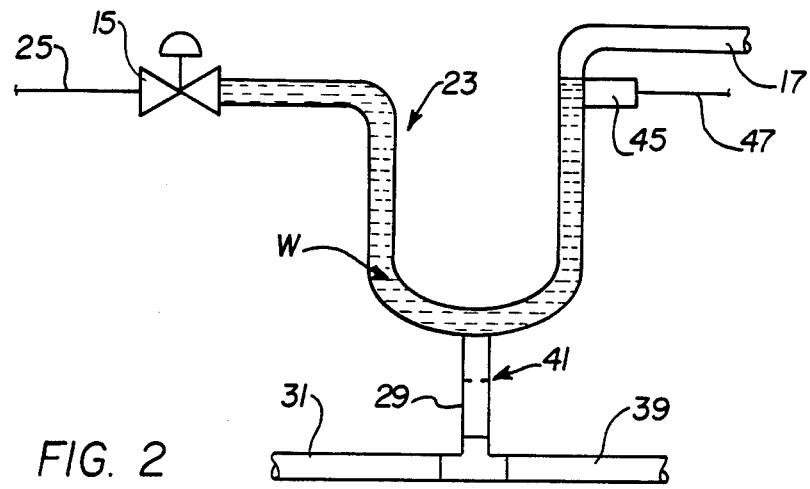
FIG. 2 is a schematic representation of a loop seal and associated equipment for one of the power operated relief valves under normal conditions.
Figure 3:
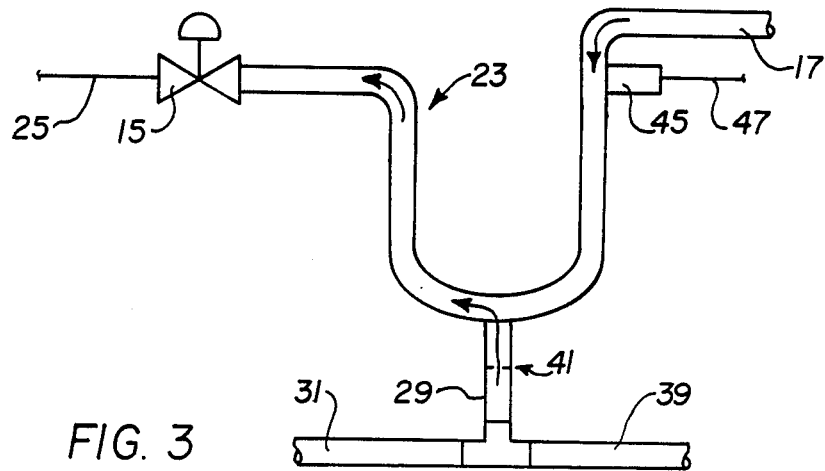
FIG. 3 is a schematic representation similar to FIG. 2 showing the loop seal, with the power operated relief valve open, after discharge of the water seal therefrom, with steam passing therethrough and water supplied to the loop seal.
Figure 4:
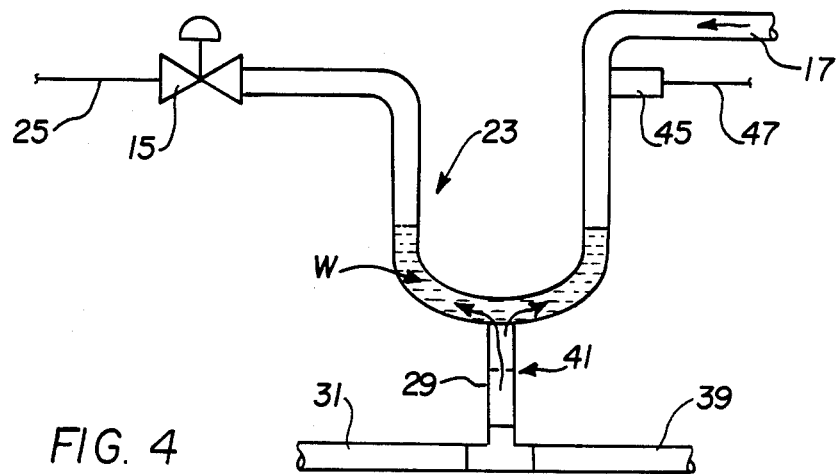
FIG. 4 is a schematic representation similar to FIG. 2 showing the loop seal, after closing of the power operated relief valve, with water being supplied to the loop seal to form a replacement water seal for the valve.

The operation of the present pressure control system, showing one of the power operated relief valves and flow of water to replenish the water seal in an associated loop seal is illustrated in FIGS. 2 through 4. In normal operation, (FIG. 2) with the pressurizer under the predetermined pressure which would actuate the power operated relief valve 15, the loop seal 23 is filled with water such that the valve seat of the power operated relief valve is water covered and protected from steam in line 17. In this condition, the temperature detector 45 senses the temperature of the water w, a relatively low temperature in comparison with the steam temperature, in the loop seal and through lead 47 maintains the valve 43 in common water supply line 35 in closed position. When pressure rises in the pressurizer, the relief valve opens and the initial water seal w is blown from the loop seal through line 25 to the pressurizer relief tank 27, and steam from line 17 will also pass through the loop seal 23, power operated relief valve 15, and line 25 to the pressurizer relief tank 27. With passage of steam through the loop seal 23, the loop seal area temperature rises with the invasion of the high temperature steam. The temperature increase is sensed by the temperature detector 45, which, through lead 47 actuates the solenoid valve 43 on the common water supply line 35 which charges water to fill line 39, and through flow control orifice 41 in line 29 to the loop seal 23 (FIG. 3). As the pressure in the pressurizer 3 returns to below the predetermined pressure for actuating the power operated relief valve 15, the valve 15 will close. As the power operated relief valve 15 closes, water injected through the orifice is available to quickly form a supply of water in the loop seal 23 (FIG. 4). Condensation of steam in the loop seal 23 and injection of water into the loop seal 23 through the orifice 41 will continue until the temperature detector 45 senses a drop in temperature in the area of the loop seal due to the presence of water, and with the drop in temperature, the temperature detector 45, through lead 47, will close the valve 43 in the water supply line 35, resulting in a quickly formed water seal, without the normal delay that results in formation of such a water seal solely through condensation of steam in the loop seal 23. At this stage, the loop seal is again under the normal condition illustrated in FIG. 2. It is estimated that using the present invention, complete valve closure through formation of the water seal w in the loop seal 23 can be effected at a rate of least four to five times faster than conventional condensation formation of the water seal.

While the temperature detector 45 is illustrated as a strap-on non-invading type and on the upstream side of the loop seal, other types of temperature detectors could be used, and placement of the detectors at other locations could be made, provided that the same is effective to actuate the valve in the water supply line at the desired times.

Since conventional pressurizer water reactor nuclear plants operate normally at about 2235 to 2285 psig (pounds per square inch gauge), with a water temperature of about 266°–635° F. (328°–335° C.), and are adapted to withstand a pressure of about 2485 psig and water temperature of about 685° F. (363° C.), the pressure operated relief valves on the pressurizer are normally set to open at about a pressure of 2375–2385 psig, while the safety relief valves on the pressurizer are normally set to open at a pressure of about 2435 psig. Upon such opening, the steam passing through the valves will be at or below about 680° F. (360° C.). The water in the loop seal, due to cooling to the ambient is normally at a temperature of about 100°–150° F. (38°–65° C.), under normal operating conditions.

According to the present invention, the temperature detector on the loop seal would be set to open the water supply valve to the loop seal at a temperature of about 275°–450° F. (135°–232° C.). Thus, upon discharge of the water from the loop seal, the temperature would rise above the preset temperature of the detector and initiate injection of water thereto. Although the water fed from the line to the pressurizer sprayers may be normally at a temperature of 520°–580° F. (271°–305° C.), upon passage through the water supply line and upon containment within the loop seal, the temperature of the water will drop rapidly due to loss of heat to ambient, and below the setpoint for the temperature detector from the valve to the supply line, and when the water seal is replenished, the temperature detector will close that valve.

In conventional systems, it can take a time period of about two hours to fill the loop seal with water through condensation of steam therein. Using the system of the present invention, it is believed that the time period can be shortened by a factor of at least four or five times, and the time period could be shortened to as low as five to fifteen minutes.

What is claimed is:

1. In a pressure control system of a pressurized water nuclear reactor, containing a pressurizer, water sprayers and means for charging water to said water sprayers, heaters, power operated relief valves and safety relief valves, wherein the valves each are connected to the pressurizer through a conduit forming a loop seal upstream from each valve for accumulation of a water seal for the valve seat thereof, and the valves discharge through a line to a pressurizer relief tank, the improvement comprising:
    means for charging water to each of said loop seals;
    means for sensing a variation in temperature in each of said loop seals resulting from the discharge of the water seal therefrom and passage of steam therethrough, or formation of a water seal replacing steam therein; and
    means responsive to said means for sensing a variation in temperature to activate said means for charging water to charge water to at least one of said loop seals upon a rise in temperature therein, and deactivate said means for charging water thereto upon a drop in temperature therein.

2. The pressure control system of a pressurized water nuclear reactor as defined in claim 1, wherein said means for charging water to each of said loop seals is a water supply conduit which directs water from the means for charging water to said water sprayers.

3. The pressure control system of a pressurized water nuclear reactor as defined in claim 2 wherein each said loop seal has a drain conduit, and said means for charging water to each said loop seal is connected to said drain conduit for said loop seal and a flow control orifice is contained within said drain conduit.

4. The pressure control system of a pressurized water nuclear reactor as defined in claim 3 wherein said means for charging water to each said loop seal includes a common water supply conduit and a plurality of branch conduits, one of each of said branch conduits supply water to a respective drain conduit.

5. The pressure control system of a pressurized water nuclear reactor as defined in claim 4 wherein said means responsive to said means for sensing a rise in temperature comprises a valve in said common water supply conduit.

6. The pressure control system of a pressurized water nuclear reactor as defined in claim 5 wherein said common water supply conduit is connected to the means for charging water to said water sprayers, said common water supply conduit having a flow restriction orifice therein upstream from said valve therein.

7. The pressure control system of a pressurized water nuclear reactor as defined in claim 2 wherein said water supply conduit has a flow restricting orifice contained therein.

8. The pressure control system of a pressurized water nuclear reactor as defined in claim 1 wherein said means for sensing a variation in temperature is a strap-on non-invasive temperature sensor and said means responsive thereto is a solenoid valve located in a water supply line to said loop seals.

9. In a pressure control system of a pressurized water nuclear reactor, containing a pressurizer, water sprayers and a sprayer conduit for charging water to said water sprayers, heaters, power operated relief valves and safety valves, wherein the valves each are connected to the pressurizer through a conduit forming a loop seal upstream from each valve for accumulation of a water seal for the valve seat thereof, each said loop seal having a drain conduit thereon, and the valves discharge through a line to a pressurizer relief tank, the improvement comprising:
    a water supply conduit and plurality of branch conduits, the water supply conduit communicating between said sprayer conduit and said branch conduits and having a water supply valve therein, and one of said plurality of branch conduits cooperating with a drain conduit of each of said loop seals;
    a temperature detecting device on each of said loop seals for sensing a variation in temperature therein, said temperature detecting device effective to open the water supply valve to feed water to the loop seal upon a rise in temperature within the area of the loop seal, and close the water supply valve to stop the feed of water to the loop seal upon a drop in temperature within the area of the loop seal.

10. The pressure control system of a pressurized water nuclear reactor as defined in claim 9 wherein a flow restriction orifice is provided in said water supply conduit between said sprayer conduit and said water supply valve.

11. The pressure control system of a pressurized water nuclear reactor as defined in claim 10 where a flow restriction orifice is provided in each of said drain conduits.

12. A method for effecting the closing of power operated relief valve or safety valve of a pressure control system for a nuclear reactor plant containing such valves, and a pressurizer, with water supplied to the pressurizer through a conduit to water sprayers which valves have a water-filled loop seal connected therewith, the water in said water-filled loop seal being discharged therefrom when the valve is opened and steam passed therethrough comprising:

sensing the temperature rise in the area of said loop seal, above a predetermined temperature, caused by the discharge of water therefrom and passage of steam therethrough;

charging water to said loop seal upon sensing of said temperature rise in an amount to produce a replacement water seal therein and lower the temperature to below said predetermined temperature in the area of said loop seal; and stopping the flow of said charging water to said loop seal upon lowering of the temperature of the area of the loop seal below said predetermined temperature.

13. The method as defined in claim 12 wherein said water charged to said loop seals is a portion of the water in the conduit supplied to the water sprayers of the pressurizer.

14. The method as defined in claim 13 wherein the rate of flow of water charged to said loop seal is controlled by at least one flow restriction orifice.

15. The method as defined in claim 14 wherein each said loop seal has an upstream and downstream leg and the sensing of the temperature rise and drop are effected at the upstream leg of said loop seal.

* * * * *